United States Patent

Ouchi

[11] Patent Number: 5,099,972
[45] Date of Patent: * Mar. 31, 1992

[54] ONE WAY CLUTCH

[75] Inventor: Yoshio Ouchi, Hamakita, Japan

[73] Assignee: Yamaha Hatsudoki Kabushiki Kaisha, Iwata, Japan

[*] Notice: The portion of the term of this patent subsequent to Apr. 5, 2005 has been disclaimed.

[21] Appl. No.: 609,004

[22] Filed: Nov. 2, 1990

Related U.S. Application Data

[63] Continuation of Ser. No. 845,601, Mar. 28, 1986, abandoned.

[30] Foreign Application Priority Data

Apr. 9, 1985 [JP] Japan .................................. 60-73600
May 29, 1985 [JP] Japan .................................. 60-115953

[51] Int. Cl.⁵ ............................................. F16D 41/06
[52] U.S. Cl. ...................................... 192/45; 192/48.6
[58] Field of Search ............... 192/45, 44, 45.1, 48.6, 192/81 R, 41 A; 188/82.84

[56] References Cited

U.S. PATENT DOCUMENTS

| | | | |
|---|---|---|---|
| 4,236,619 | 12/1980 | Kuroda | 192/45 |
| 4,415,072 | 11/1983 | Shoji et al. | 192/45 |
| 4,735,299 | 4/1988 | Ohuchi | 192/45 |

FOREIGN PATENT DOCUMENTS

| | | | |
|---|---|---|---|
| 1025217 | 2/1958 | Fed. Rep. of Germany | 192/45 |
| 2134618 | 1/1973 | Fed. Rep. of Germany | 192/45 |
| 1026948 | 4/1966 | United Kingdom | 192/45 |

Primary Examiner—Richard E. Chilcot, Jr.
Attorney, Agent, or Firm—Ernest A. Beutler

[57] ABSTRACT

Several embodiments of applications for a new and improved one-way clutch. The one-way clutch has a caging member for receiving the rollers of the clutch which is formed from a lightweight material such as sintered metal or plastic. A wedging member is affixed relative to the caging member and has projections that extend into the caging member recesses and against which the rollers react. The wedging member is formed from a higher strength material but is smaller than the caging member so as to reduce the weight of the clutch. In the illustrated embodiments, the one-way clutch is utilized for driving the engine crankshaft from a starter motor.

11 Claims, 7 Drawing Sheets

ONE WAY CLUTCH

This is a continuation of U.S. patent application Ser. No. 845,601, filed Mar. 28, 1986 now abandoned.

BACKGROUND OF THE INVENTION

This invention relates to an improved one-way clutch and more particularly to an improved, lightweight and low cost one-way clutch.

One-way clutches are utilized for a wide variety of purposes. Such clutches are employed so as to provide unidirectional drive between a driving and a driven member while permitting the driven member to overrun the driving member or to rotate in an opposite direction without interference from the driving member. One form of such clutch employs an annular inner member having a cylindrical outer surface. A caging member encircles the inner member and defines a number of recesses in which individual balls are received. The balls are urged against a wedging surface and into engagement with the cylindrical surface of the inner member so as to provide a driving relationship in one direction while permitting the overrunning or reverse rotation as aforedescribed.

A prior art type of one-way clutch is illustrated in FIGS. 1 and 2 of the drawings and now will be described by reference to those two figures. Such a clutch is indicated generally by the reference numeral 11 and is particularly adapted to transmit a drive to a driven shaft 12 from a driving element, such as a gear 13. The one-way clutch 11 is designed so as to permit drive to be transmitted from the gear 13 to the shaft 12 while permitting the shaft to overrun the gear 13 or to rotate in an opposite direction freely to the gear 13.

The one-way clutch 11 is comprised of a caging member, indicated generally by the reference numeral 14 that defines a plurality of recesses 15 in which rollers 16 are positioned. The rollers 16 are adapted to cooperate with a cylindrical outer surface 18 of an inner member 19 which is fixed for rotation with the gear 13. The inner member 19 and specifically its outer surface 18 is spaced inwardly from a corresponding cylindrical inner surface 21 of the caging member 14. The inner surface 21 is interrupted by the recesses 15.

A plunger 22 is slidably supported in a bore 23 of the caging member 14 adjacent each recess 15. A coil compression spring 24 is received in each of the bores 23 and urges the respective plunger 22 into engagement with the rollers 16. The rollers 16 are, in turn, cammed by the camming surfaces 17 into engagement with the outer surface 18 of the inner member 19.

In the illustrated embodiment, the caging member 14 is connected to a driving plate 25 by means of a plurality of screws 26. The driving plate 25 has a splined connection 27 to the driven shaft 12 so that the caging member 14 will be driven with the driven shaft 12.

The device operates as follows. The gear 13 and inner member 19 are driven in a clockwise direction as viewed in FIG. 2. The combination of the spring biased plungers 22 and the shape of the wedging members 17 causes the rollers 16 to become wedged into engagement with the inner member surface 18 so as to transmit a drive in the same direction, as indicated by the arrow, to the caging member 14 and shaft 12. If, however, the 12 overruns, the rollers 16 will be cammed against the plungers 22 so as to permit the shaft to overrun the inner member 19.

Although this prior art type of one-way clutch has a number of advantages, the caging member must be formed from a very strong material and must have sufficient thickness so as to overcome the large compressive loads exerted by the rollers 16. Thus, it has been impractical, with prior art devices, to provide a lightweight, low cost caging member.

It is, therefore, a principal object of this invention to provide an improved one-way clutch mechanism that permits the use of a lightweight caging member without sacrificing strength.

It is a further object of this invention to provide a caging member that may be formed in convenient manner and yet which will afford high strength.

SUMMARY OF THE INVENTION

This invention is adapted to be embodied in a one-way clutch that comprises an inner member having a generally cylindrical outer surface. An outer caging member comprises of caging means defining a plurality of caging recesses adapt to cage rollers adapted to cooperate with the cylindrical outer surface is juxtaposed to the inner member. The caging means is formed from a material of relatively low tensile strength. A wedging member is fixed relative to the caging means and is formed from a material having a substantially greater strength than the caging means and which has camming portions that extend into the caging recesses and which are adapted to engage the rollers for camming the rollers into engagement with the cylindrical outer surface for transmitting driving forces therebetween.

DETAILED DESCRIPTION OF THE PREFERRED EMBODIMENTS

Figure 1:
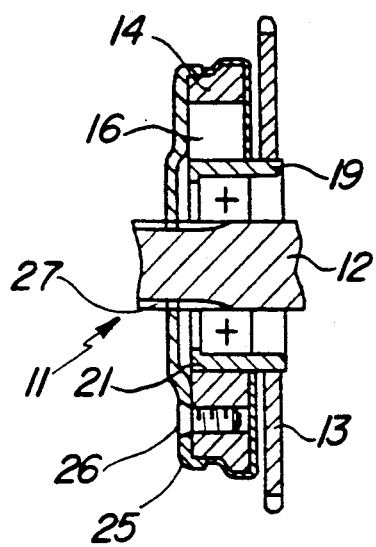
FIG. 1 is a cross-sectional view taken through a one-way clutch of the prior art type.
Figure 2:
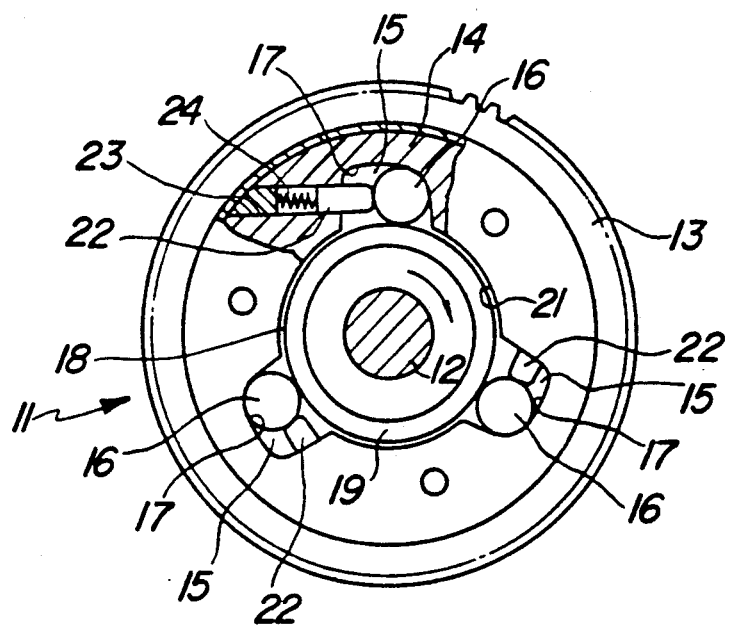
FIG. 2 is a side elevational view, with a portion broken away, of the prior art one-way clutch shown in FIG. 1.
Figure 3:
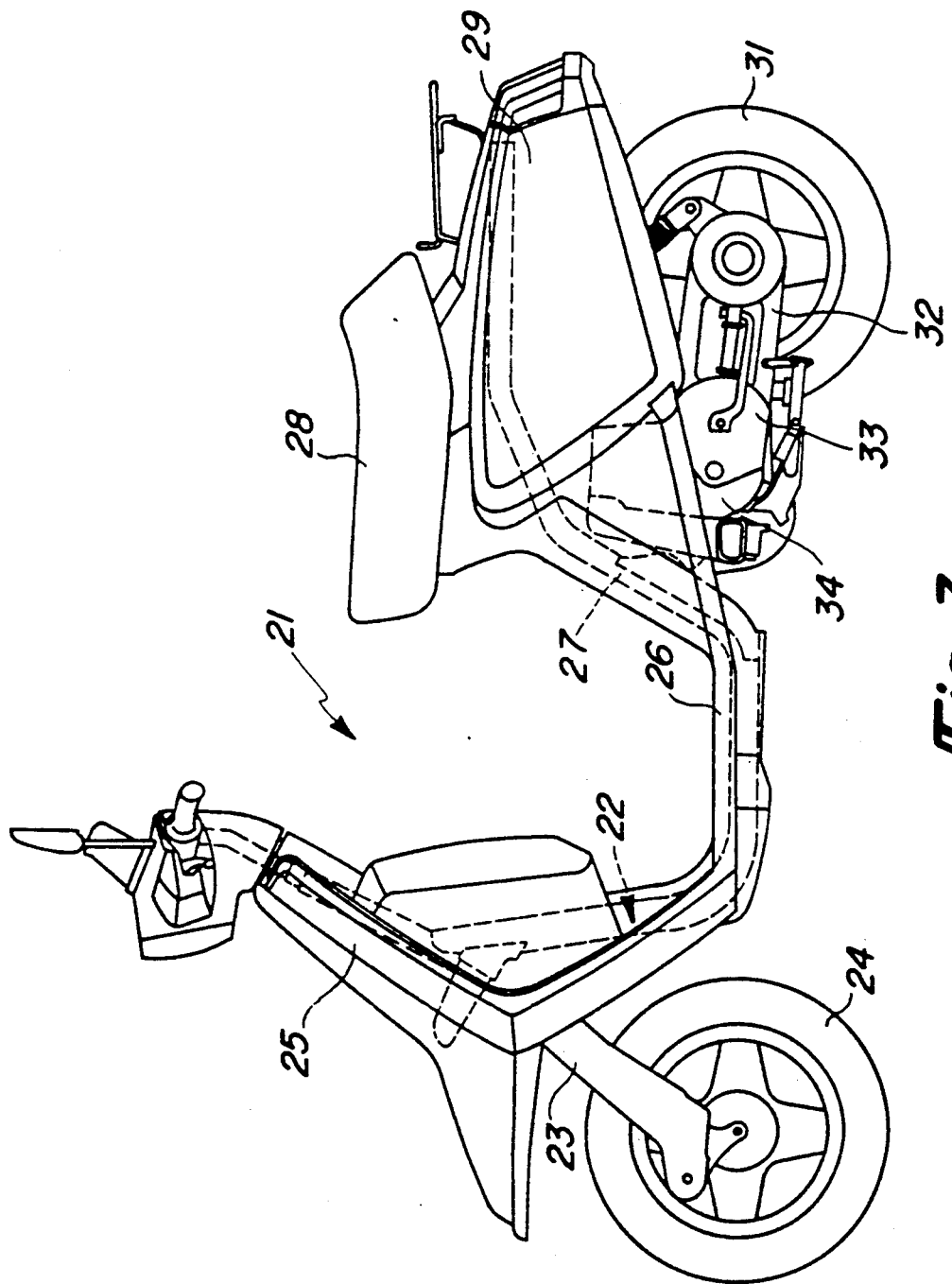
FIG. 3 is a side elevational view of a motor scooter embodying an engine incorporating a one-way clutch constructed in accordance with a first embodiment of the invention.

Referring first to FIG. 3, a typical environment is illustrated in which a one-way clutch constructed in accordance with the invention may be employed. This comprises a motor scooter, indicated generally by the reference numeral 21, and having a backbone type frame assembly 22. The frame assembly 22 supports a front fork assembly 23 for steering movement and the front fork assembly 23 rotatably journals a front wheel 24. A front cowling 25 is carried by the frame 22 and covers the front portion of the motor scooter 21.

The frame assembly 22 includes a platform 26 for the rider's feet and from which there extends a vertically upwardly extending frame member 27. A rear seat 28 is carried on the frame member 27 and overlies a luggage carrier 29.

A rear wheel 31 is suspended from the frame 22 by means including a trailing arm assembly 32. The rear wheel 31 is driven from a power unit, indicated generally by the reference numeral 33, in a manner to be described. The power unit 33 includes an internal combustion engine 34.

Figure 4:
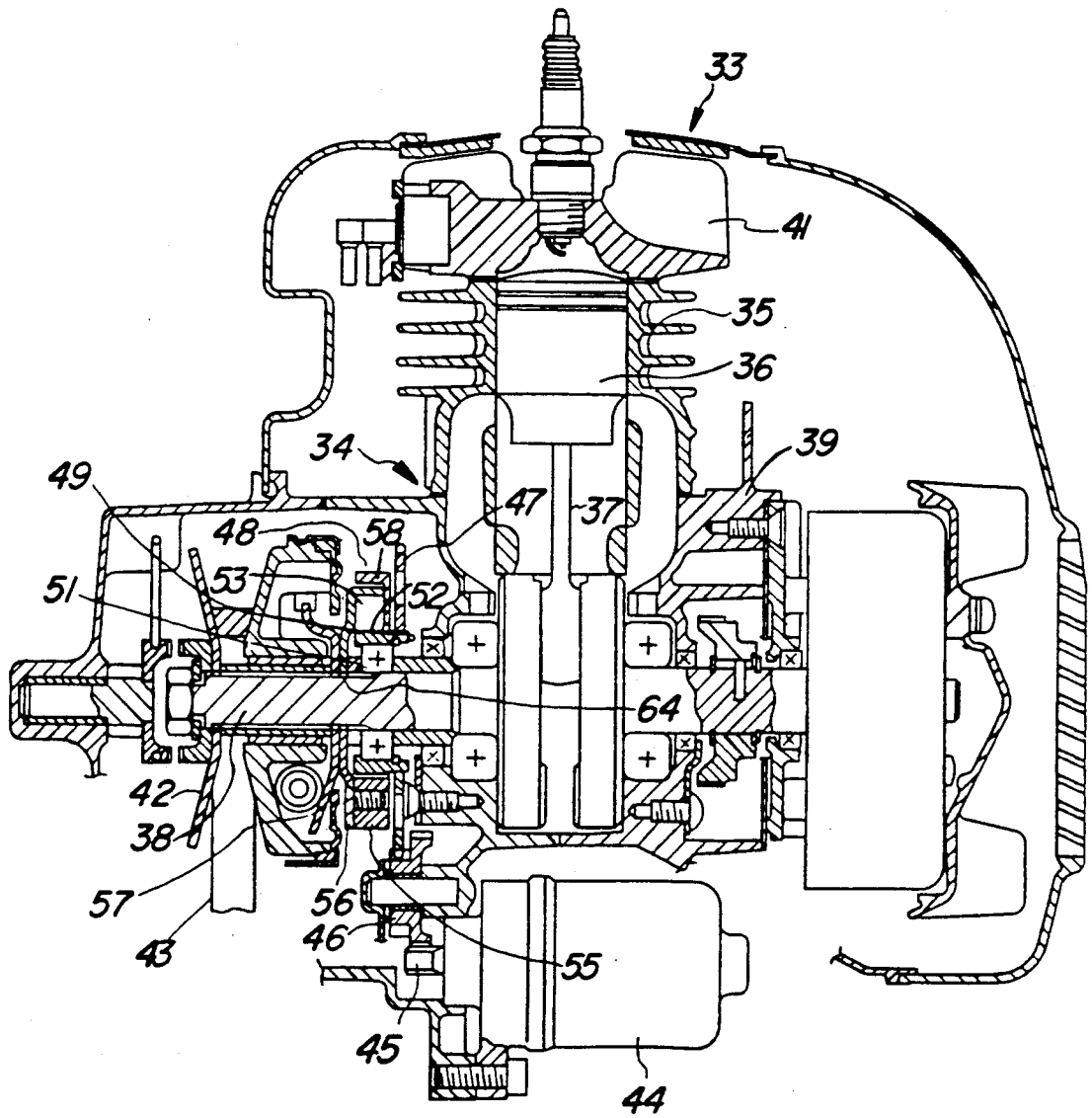
FIG. 4 is an enlarged cross-sectional view taken through the power lant of the motor scooter shown in FIG. 3 and includes the showing of the one-way clutch.

Referring now to FIG. 4, the construction and operation of the power unit 33 will be described. As has been noted, the power unit 33 includes an internal combustion engine 34, which in the illustrated embodiment, is of the single cylinder, two cycle, crankcase compression type. The engine 34, which may be considered to be conventional, is comprised of a cylinder block 35 in which a piston 36 is supported for reciprocation. The piston 36 is connected by means of a connecting rod 37 to a crankshaft 38. The crankshaft 38 is, in turn, rotatably journaled within a crankcase assembly 39 to which the cylinder block 35 is affixed in a known manner. A cylinder head 41 is suitably attached to the cylinder block 35. Since the construction of the engine 34 is conventional and forms no part of the invention, it will not be described any further.

A combined variable speed drive and centrifugal clutch, indicated generally by the reference numeral 42, is affixed to the outer end of the crankshaft 38 an drives the rear wheel 31 in a suitable manner by means including a belt 43. Like the construction of the engine 34, the variable speed drive 42 may be considered to be conventional and since it forms no part of the invention, it will not be described in any further detail.

Figure 5:
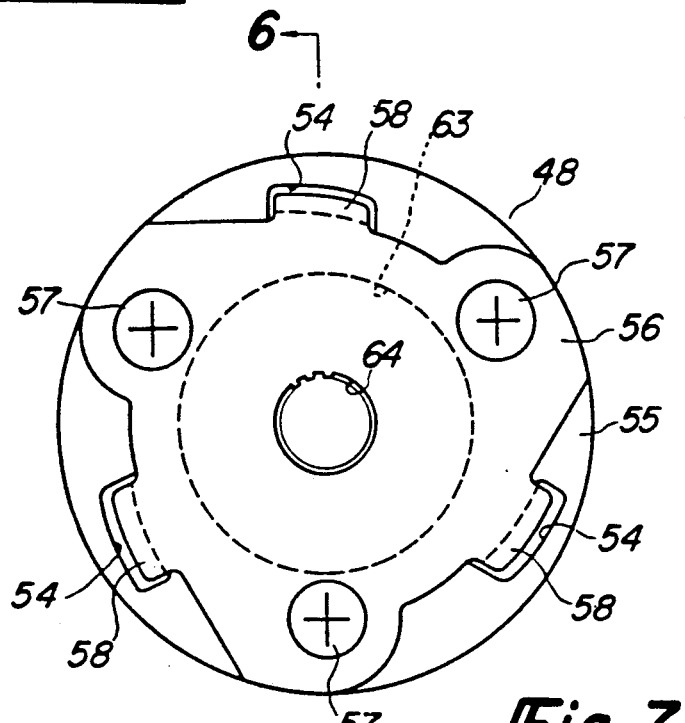
FIG. 5 is an enlarged rear side elevational view of the one-way clutch.
Figure 6:
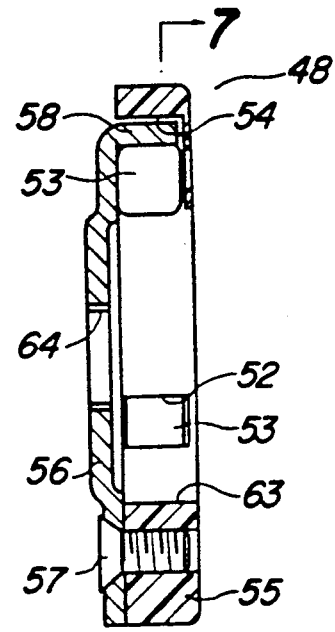
FIG. 6 is a cross-sectional view taken along the line 6—6 of FIG. 5.
Figure 7:
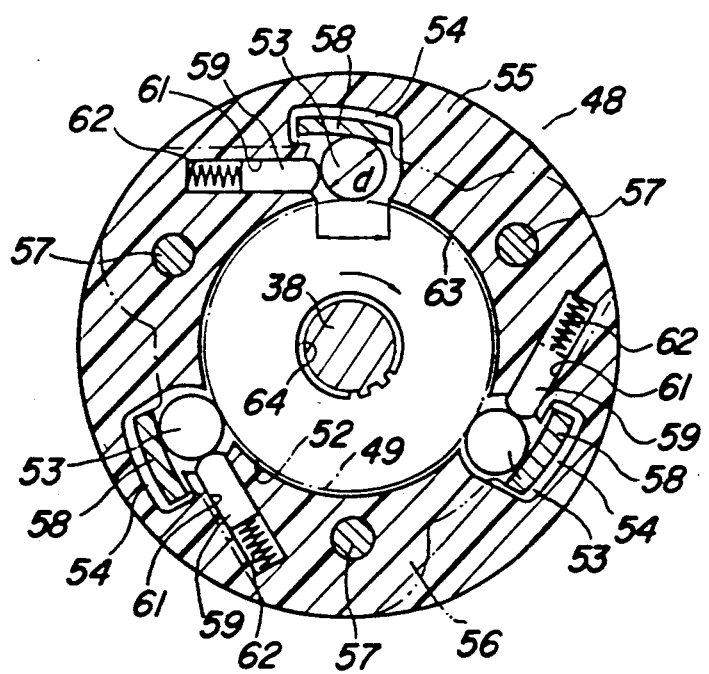
FIG. 7 is a cross-sectional view taken along the line 7—7 of FIG. 6.

An electric starter motor 44 is provided for electrical starting of the engine 34. To this purpose, the output shaft of the starter motor 44 drives a pinion gear 45, which is in mesh with an idler gear 46. The idler gear 46. in turn, drives a gear 47 that is coupled to the crankshaft 38 by means of a one-way clutch constructed in accordance with an embodiment of the invention and identified generally by the reference numeral 48. The construction of the one-way clutch 48 may be best understood by reference to FIGS. 5 through 7 wherein the clutch is illustrated in detail.

The one-way clutch 48 is comprised of an inner, driving member 49 that is affixed for rotation with the gear 47 in an appropriate manner. The inner member 49 is journaled on the crankshaft 38 by means including an anti-friction bearing 51. The inner member 49 has a cylindrical outer peripheral surface 52 that is engaged by a plurality of roller members 53. In the illustrated embodiment, there are three such roller members.

The roller members 53 are received within recesses 54 of a caging member, indicated generally by the reference numeral 55. The caging member 55 is, unlike conventional caging members of one-way clutches, formed from a lightweight relatively low tensile strength material such as a molded plastic or a sintered metal. This permits a very light weight as compared with prior art type of one-way clutch constructions wherein the caging member must take the wedging forces exerted by the rollers 53.

In accordance with the invention, a wedging member, indicated generally by the reference numeral 56, is provided for taking these forces. The wedging member 56 is formed from sheet steel or some other suitable material of high tensile strength and is affixed to one side of the caging member 55, by means of a plurality of machine screws 57. The wedging member 56 has a plurality of wedging projections 58 that extend into the caging member recesses 54 and which are adapted to engage the rollers 53.

The roller members 53 are urged into engagement with the cylindrical surface 52 of the inner member 49 by means of individual plungers 59. Each plunger 59 is received in a bore 61 formed in the caging member 55 which intersects its recess 54. The plungers 59 are urged into engagement with the rollers 53 by coil compression springs 62 that are received within the base of the bores 61.

It should be noted that the caging member 55 has a cylindrical inner surface 63 that is spaced radially outwardly from the cylindrical surface 52 of the inner member 49 and that the recesses 54 intersect this inner surface 63. The recesses have an opening with a width "L" that is less than the diameter "d" of the rollers 53 so that they can be inserted into the recesses 54 on assembly.

The wedging member 56 is formed with a splined opening 64 that is in driving relationship with splines formed on the crankshaft 38.

The one-way clutch 48 operates in the manner now to be described. When the engine 34 is not running and the electrical starter 44 is energized, the gears 45 and 46 will drive the gear 47 and the annular inner member 49 in a clockwise direction as indicated by the arrow in FIG. 7. This direction of rotation will cause the rollers 53 to transmit a force to the wedging member 56 because of the inclination of the wedging member projections 58 so that the wedging member 56 will be rotated in the same, clockwise direction. This rotation is transmitted to the crankshaft 38 through the splined connection 64.

When the engine 34 starts and begins to run under its own power, its crankshaft 38 will rotate at a speed greater than the speed which the crankshaft was rotated by the starter motor 44. Hence, the wedging member 56 will be rotated in the clockwise direction at a higher rate of speed and the wedging surfaces of the wedging projections 58 will overrun the rollers 53 and there will be no driving force transmitted to the inner member 49. Hence, the starter motor 44 will not be driven and the gear train 45 and 46 and 47 will remain stationary.

Figure 8:
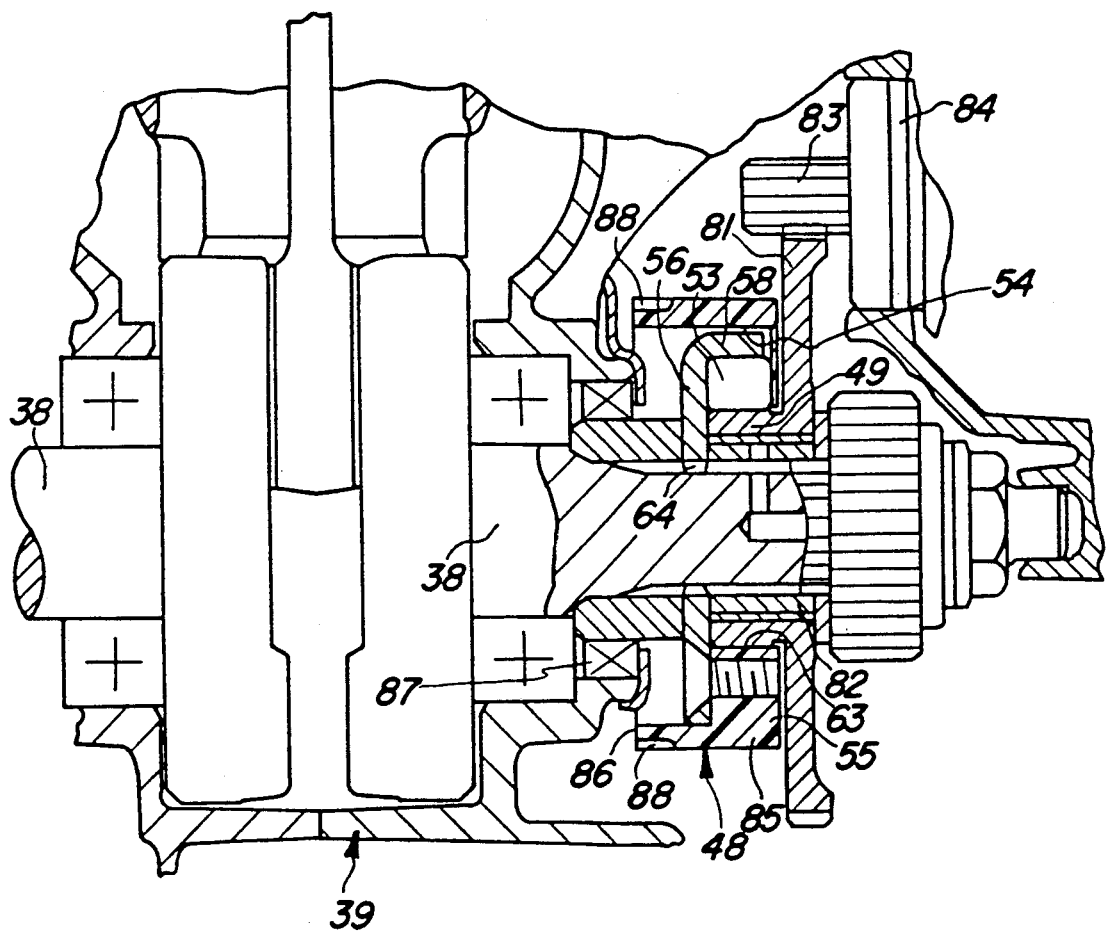
FIG. 8 is a cross-sectional view taken through a power plant constructed in accordance with another embodiment of the invention.

In the embodiment thus far described, the one-way clutch 48 was positioned between the cylinder block and the variable speed transmission 42. It is to be understood that it may be positioned in other locations and FIG. 8 shows another such location. In this embodiment, the one-way clutch has the same general construction as the previously described embodiment and elements which are the same or substantially the same are indicated by the same reference numeral and will not be described again in detail, except insofar as is necessary to understand the construction and operation of this embodiment.

In this embodiment, the inner member 49 is formed integrally with a gear 81 which is, in turn, journaled upon the crankshaft 38 by means of an anti-friction bushing 82. The gear 81 is in mesh with a gear 83 formed at the outer end of the shaft of a starter motor 84. Thus, the starter motor 84 can drive the crankshaft 38 through the gear connection 83, 81 and one-way clutch 48 as with the previously described embodiment.

In this embodiment, the caging member 55 is provided with an annular extension 85 that extends toward the crankcase 39 and which terminates at an inner shoulder 86 which overlies a seal 87 at the outer end of the crankcase 38. Adjacent the edge 86, there are provided a plurality of corrugations 88 that act as a slinger to throw oil away from the seal 87.

Figure 9:
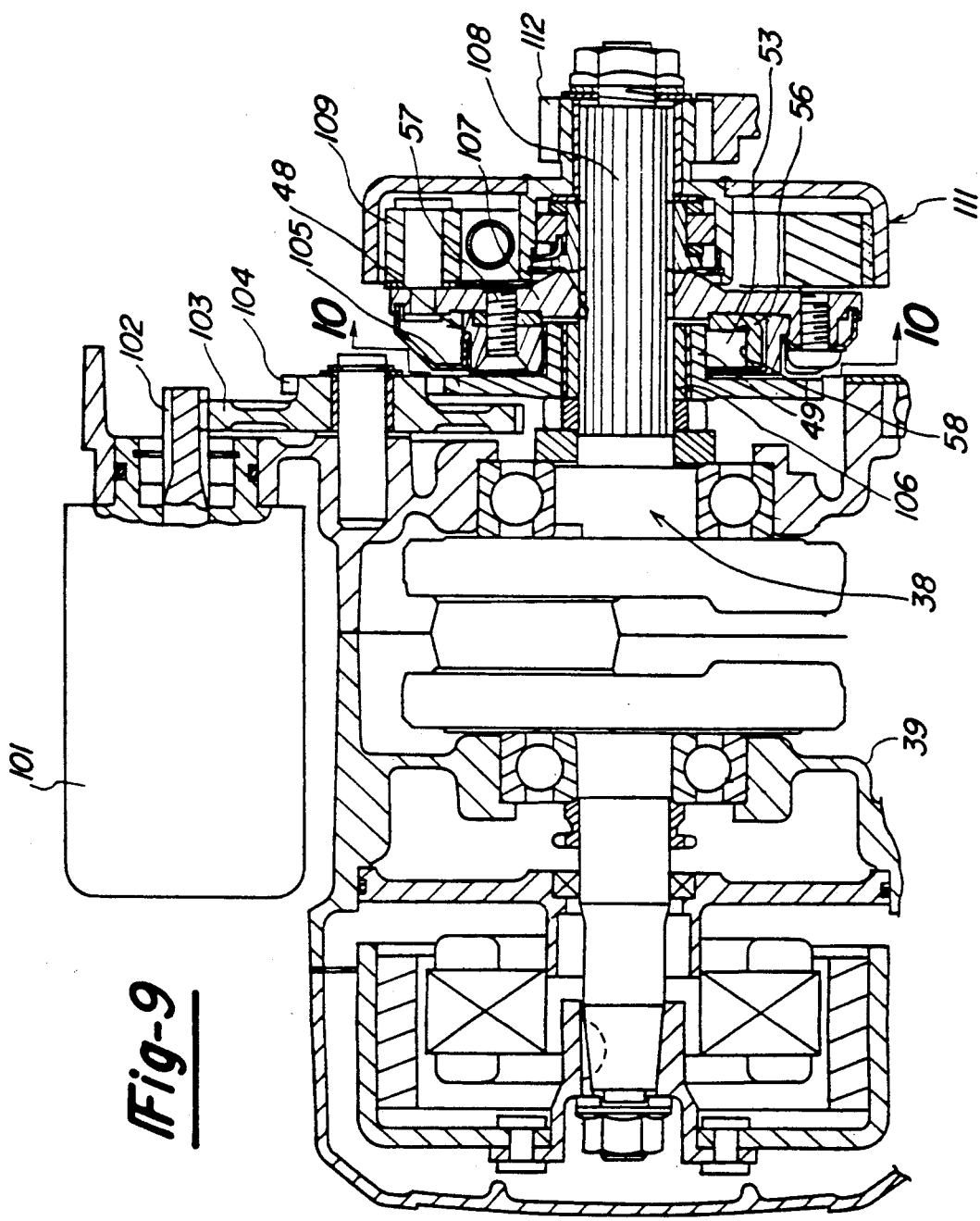
FIG. 9 is a cross-sectional view, in part similar to FIGS. 4 and 8, showing a still further embodiment of the invention.
Figure 11:
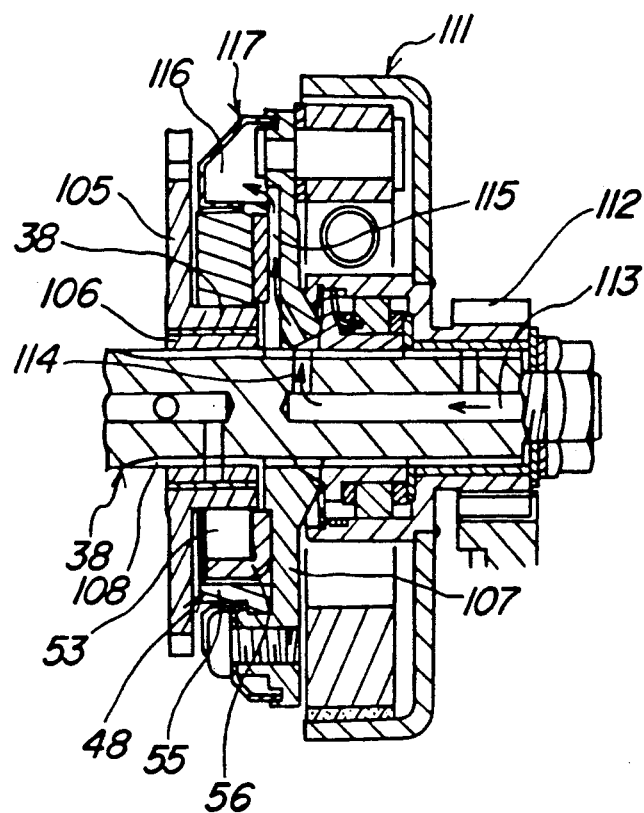
FIG. 11 is a cross-sectional view taken along the line 11—11 of FIG. 10.
Figure 10:
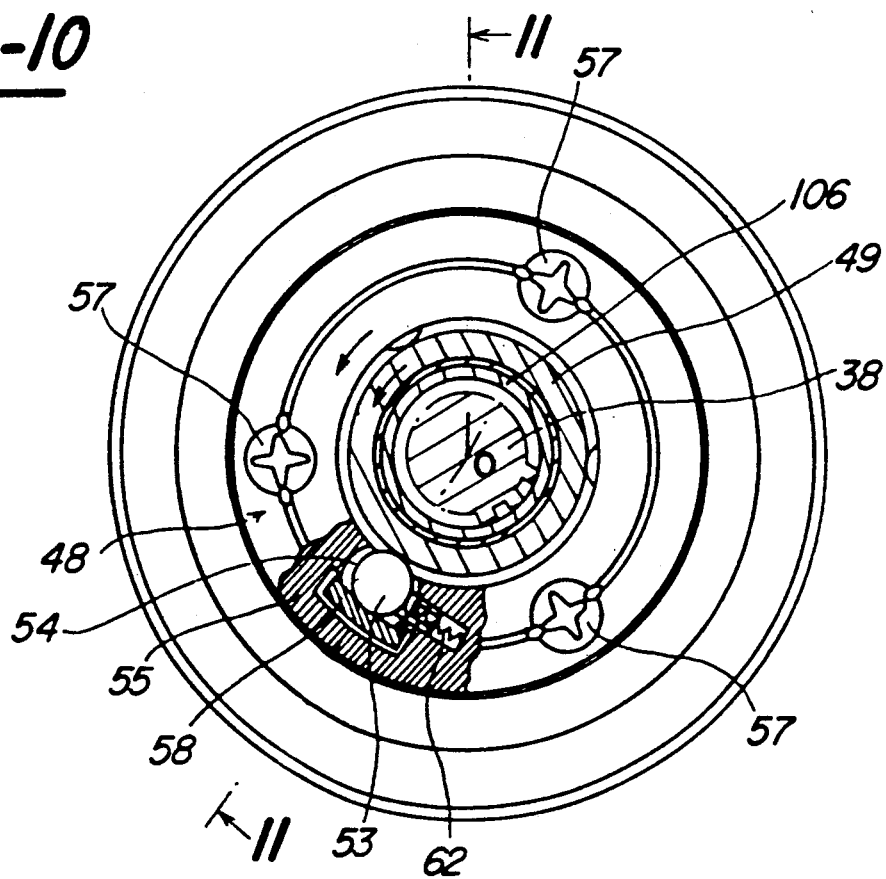
FIG. 10 is an enlarged cross-sectional view taken along the line 10—10 of FIG. 9.

FIGS. 9 through 11 show a still further embodiment of the invention. Like the embodiment of FIG. 8, the one-way clutch of this embodiment is the same as that of FIGS. 3 through 7. Only the relationship of the one-way clutch to the other elements of the engine differs from the previously described embodiment and, for that reason, components of the one-way clutch which are the same as the previously described embodiments are identified by the same reference numerals and will not be described again in detail, except insofar as is necessary to understand the construction and operation of this embodiment.

In this embodiment, a starter motor 101 has an output shaft on which a gear 102 is formed. The gear 102 meshes with a gear 103 of a gear cluster. The other gear 104 of this gear cluster meshes with a gear 105 which is formed integrally with the one-way clutch inner member 49 as in the embodiment of FIG. 8 and which is journaled upon the crankshaft 38 by means of a bushing 106.

In this embodiment, the wedging member 56 does not itself have a splined connection to the crankshaft. Rather, the wedging member 56 is affixed by the screws 57 to both the caging member 55 and to a carrier ring 107. The carrier ring 107 has a connection to splines 108 of the crankshaft 38 so that the one-way clutch 48 can drive the crankshaft 38 during operation of the starter motor 101. As with the previously described embodiments, however, the one-way clutch 48 permits the crankshaft 38 to overrun the starter motor 101 once the engine starts.

In this embodiment, the carrier member 107 has outwardly extending projections that carry inertial members 109 of a centrifugal clutch assembly, indicated generally by the reference numeral 111. The centrifugal clutch assembly 111 has, on its driven element, an integral gear 112 which is utilized for driving the vehicle through an appropriate transmission (not shown).

In this embodiment, an arrangement is also provided for lubricating the one-way clutch 38. To this end, the outer end of the crankshaft 38 is provided with an axially extending oil passageway 113 that receives pressurized oil in a suitable manner. The passageway 113 terminates in a radially extending passageway 114 that registers with a corresponding radial passageway 115 formed in the carrier member 107. This passageway 115 opens into a cavity 116 that is contained within a cover plate 117 that is affixed to the carrier member 107 by means of screws. Hence, oil from the chamber 116 may flow across the components of the one-way clutch and be discharged through a clearance that exists between the splines 108 and the bushing sleeve 106.

It should be readily apparent from the foregoing description that a number of embodiments have been illustrated and described and each of which incorporates a one-way clutch in which the caging member is formed as a composite construction which permits the use of a lightweight material. By transmitting the driving forces through a separate caging member, only the caging member need be formed from a more dense high tensile strength material and thus the total clutch weight may be reduced without sacrificing its strength in any way. In addition, a number of environments in which the clutch may be employed have been disclosed. It is to be understood, however, that the foregoing is only a description of preferred embodiments of the invention and that various changes and modifications may be made, without departing from the spirit and scope of the invention, as defined by the appended claims.

I claim:

1. In a one-way clutch comprising an inner member having a generally cylindrical out surface, an outer caging member comprised of caging means defining a plurality of caging recesses adapted to receive rollers, rollers positioned within said recesses and adapted to cooperate with said cylindrical outer surface, said outer caging member being juxtaposed to said inner member with said recesses in proximity to said cylindrical outer surface, said caging means being formed from a material of relatively low tensile strength, and a wedging member fixed relative to said caging means and formed from a material having a substantially greater strength than said caging means and having camming portions extending into said caging recesses and adapted to engage said rollers for camming said rollers into engagement with said cylindrical outer surface for transferring driving forces between said inner member and said wedging member.

2. In a one-way clutch as set forth in claim 1 wherein the wedging member is non-rotatably affixed to the caging means and the caging means has an annular configuration, the wedging member having a plate-like configuration with inturned projections extending into the caging means recesses.

3. In a one-way clutch as set forth in claim 2 wherein the caging means is formed from a sintered metal.

4. In a one-way clutch as set forth in claim 2 wherein the caging means is formed from a plastic.

5. In a one-way clutch as set forth in claim 2 wherein there are a plurality of spring biased camming members carried by the caging means for urging the rollers into engagement with the wedging member.

6. In a one-way clutch as set forth in claim 1 in combination with an internal combustion engine wherein the wedging member is affixed for rotation with an output shaft of the engine.

7. In a one-way clutch as set forth in claim 6 further including a starter motor associated with the inner member for driving the inner member to start the engine.

8. In a one-way clutch as set forth in claim 7 further including a variable speed transmission disposed in proximity to the one-way clutch and driven by the engine.

9. In a one-way clutch as set forth in claim 7 wherein the starter motor drives a gear formed integrally with the inner member.

10. In a one-way clutch as set forth in claim 7 further including a centrifugal clutch driven by the wedging member for powering an associated vehicle.

11. In a one-way clutch as set forth in claim 7 further including means for delivering a lubricant to the one-way clutch.

* * * * *